United States Patent [19]

Reynolds

[11] Patent Number: 4,930,962

[45] Date of Patent: Jun. 5, 1990

[54] NUT AND STUD ASSEMBLY

[75] Inventor: Richard L. Reynolds, Grosse Pointe Shores, Mich.

[73] Assignee: Pac-Fasteners, an Affiliate of Peterson American Corp., Southfield, Mich.

[21] Appl. No.: 278,538

[22] Filed: Dec. 1, 1988

[51] Int. Cl.5 .......................... F16B 23/00; F16B 35/00
[52] U.S. Cl. ...................................... 411/366; 411/389;
411/397; 411/432; 411/937
[58] Field of Search ........................................ 411/1-5,
411/266, 267, 366–370, 384, 389, 397, 432, 433,
937; 29/525.1

[56]  References Cited

U.S. PATENT DOCUMENTS 3,233,262  2/1966  Vollman ............................... 411/937
3,440,922  4/1969  Cohen ................................... 411/397
3,461,935  8/1969  Monticelli ............................ 411/937
4,295,761  10/1981  Hansen ..................................... 411/1

Primary Examiner—Neill R. Wilson
Attorney, Agent, or Firm—Harness, Dickey & Pierce

[57]  ABSTRACT

A nut and stud assembly for securing workpieces via threaded engagement of the stud with one of the workpieces and engagement of the nut with another of the workpieces and with the nut preassembled on the stud with the stud having a stop preventing the nut from advancing further on the stud until the stud has reached a preselected position in the one workpiece whereby the nut and stud assembly will function similarly to a headed bolt until the preselected position is attained and thereafter the stop will permit movement of the nut on the stud through such stop and be free running to function similarly to a separate nut and stud combination to a final clamp up of the workpieces.

38 Claims, 2 Drawing Sheets

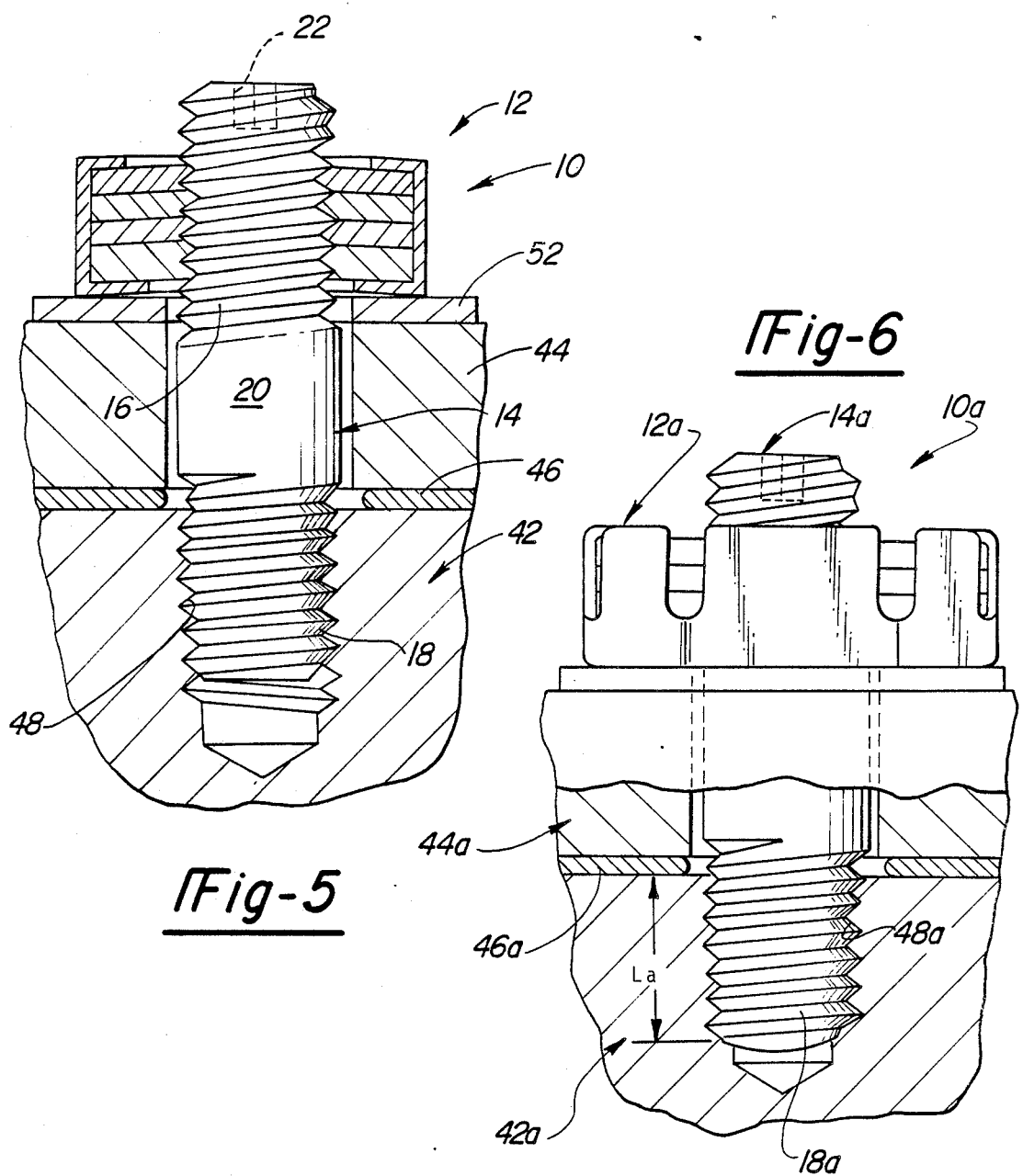

NUT AND STUD ASSEMBLY

SUMMARY BACKGROUND OF THE INVENTION

The present invention relates to a nut and a stud connected as a single assembly.

Separate nuts and studs are commonly used for assembly of many components and have certain distinct advantages over the use of bolts, such as: better torque-tension control and the use of the headless stud for holding or positioning during assembly. The disadvantages lie in difficulty in driving studs, the labor cost of assembly (two separate items as compared to a single piece item such as a bolt) and the inventory requirements of two pieces instead of one.

In the present invention a nut and stud assembly is provided and can be used in place of a single piece bolt or separate nut and stud. The operator can handle the nut and stud assembly as a bolt, thus offsetting the labor requirements of a two piece installation.

The stud portion of the assembly has one end conventionally threaded as a standard bolt and the opposite end threaded to a selected length for nut engagement and rundown. The nut end portion of the stud incorporates an area of controlled interference, precisely displaced relative to the normal thread configuration to provide interference to preposition and hold the nut. The nut is then preinstalled to this interference area and a nut and stud assembly is produced that can be handled in use as a single piece item similarly to a bolt. In this way the nut and stud assembly can be inventoried by the user as a single item.

The interference provided to retain the nut to the stud has a dual function. The interference provides a controlled magnitude of torque which must be overcome or exceeded to allow the nut to pass over the interference area and to continue over the remaining thread area. The magnitude of torque to overcome this interference is selected to exceed the torque resistance in the tapped hole, such as that caused by burrs, poorly tapped threads (from worn taps) or the increase of frictional build-up as multiple threads are engaged. This ensures that the stud will be threaded into the tapped hole prior to application of loading on the nut to provide clamp up and hence further inhibits damage to the threads in the tapped hole from nut loading.

The nut and stud assembly will continue to move the stud into the tapped hole until a preselected stop is reached. As will be seen the stop can be defined by the position at which the stud bottoms out in the tapped hole or a position on the stud at which a stop, such as additional interference, has been located for resisiting further movement of the stud into the tapped hole. The increased torque on the nut at this point overcomes the positioned thread interference with which the nut is engaged. Now the nut and stud assembly at this juncture operates essentially as the separate nut and stud, with the nut being free running on the stud and creating a clamp up load on workpieces as a two piece fastener. At the same time, upon the requirement for disassembly of the secured workpieces, the nut, upon reverse rotation, will again engage the interference section with the residual interferences resisting removal of the nut but assisting in removal of the nut and stud assembly as a unit thus facilitating disassembly of the workpieces.

Preferably the nut utilized in the nut and stud assembly can be of a laminated structure. In this regard such laminated nuts utilize laminations of hex shaped, hardened coned-disc springs, having a central opening tapped to match threads on an associated bolt. Such nuts have stacked aligned multiple discs retained by a steel outer cage having a hex shape mating with that of the nut. Examples of such laminated nut structures are shown and discussed in U.S. Pat. No. 4,383,787, issued to Reynolds on May 17, 1983.

The laminated nut can be used with a hardened stud and itself can be hardened to a higher hardness facilitating movement through the stud interference without damage to the nut threads. In this regard the laminated nut has an advantage over a conventional nut which is limited in the hardness level attainable by stresses that could result in cracking of the nut because of its brittleness.

The laminated nut construction also has the advantage of providing a desired load retention characteristic. In this regard, the laminated nut is free running on the bolt until seated. After initial clamping of the workpieces, a locking force between the nut and bolt results from the application of additional torque and rotation. The additional torque compresses and partially flattens the conical spring discs whereby a mechanical interference occurs between the thread flanks of the nut and bolt. The resultant thread interference and retained spring load between thread flanks resists unloading that might otherwise occur as a result of tensile or vibrational loads. The retained spring load also is advantageous where the workpieces are subject to thermal and pressure cycling such as found in engine block and cylinder head assemblies. Thus, in a preferred form of the present invention, the laminated nut and stud assembly has the advantages of a laminated nut while providing the advantages of a bolt, i.e. ease of operator installation and reduction in parts inventory of the conventional two piece nut and stud combinations.

Therefore it is an object of the present invention to provide a new and unique nut and stud assembly in which the nut is threadably secured to one end of the stud and its travel on the stud held off until a preselected torque is reached.

It is another object of the present invention to provide a new and unique nut and stud assembly which has the advantages of a bolt in handling and inventory and the advantages of a separate nut and stud combination in fastening workpieces together.

It is still another object of the present invention to provide a new and unique nut and stud assembly in which the nut is of a laminated construction.

It is a general object of the present invention to provide a new and unique nut and stud assembly.

Other objects, features, and advantages of the present invention will become apparent from the subsequent description and the appended claims, taken in conjunction with the accompanying drawings, in which:

Figure 1:
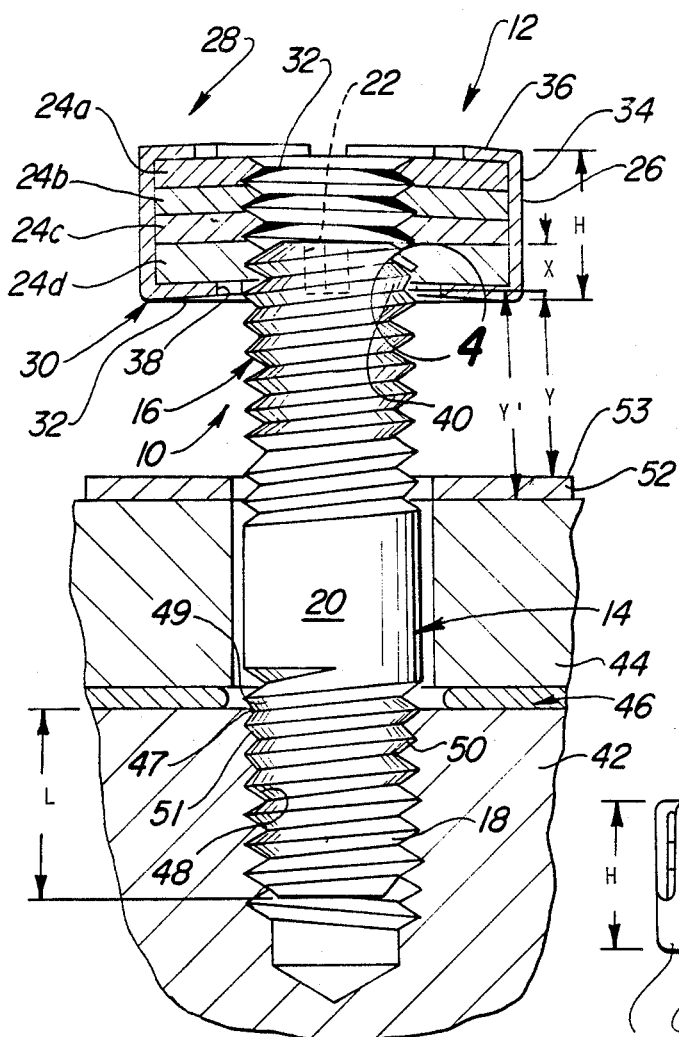
FIG. 1 is a side elevational, sectional view of a nut and stud assembly with the nut and stud assembly having been operated on to move the stud to its desired position within a threaded bore in one of a pair of workpieces and against a lower stop on the stud.

FIG. 5 is a side elevational, sectional view similar to FIG. 1 depicting the nut and stud assembly of FIG. 1 with the nut having been threadably moved past the upper stop on the stud to fasten the workpieces together; and FIG. 6 is a view similar to that of FIG. 1 depicting a modified form of nut and stud assembly and a different lower stop for determining the desired position of the stud within a threaded bore in one of the workpieces.

Looking now to the drawings, a nut and stud assembly 10 is shown and includes a nut 12 and a stud 14. The stud 14 has a first or upper threaded portion 16 at one end, a second or lower threaded portion 18 at the opposite end, and an intermediate, smooth shank portion 20 in between. The stud 14 as shown is of a generally uniform diameter with the threaded portions 16 and 18 having similar thread forms. However, it should be understood that different thread forms could be used at the opposite end portions 16 and 18 and in some cases the end portions 16 and 18 could be of different diameters. Also the stud 14 could be threaded over its entire length. An irregularly shaped cavity 22 is formed in the upper end portion 16 and has a configuration to accept a wrench head such as an Allen head wrench for a purpose to be described.

The nut 12 is preferably of a laminated construction generally of the type shown in the Reynolds patent (supra). Thus nut 12 is constructed of a series of hex shaped hardened coned, disc springs 24a-d which are held in an assembled, stacked relationship via an outer cage 26. The laminated nut 12 has a top side 28 and a bottom side 30. In order to secure the desired locking feature between the nut 12 and stud 14, the nut 12 should be mounted on the stud 14 with the bottom side 30 being the leading end of the nut 12 as it is threaded onto the stud 14. The laminations or springs 24a-d define a central bore 32 which is threaded to be matably, threadably received upon the threaded portion 16 of the stud 14. Thus when properly installed, the laminations or disc springs 24a-d are initially dished centrally outwardly from the stud 14 or axially outwardly from the bottom side 30 towards the top side 28.

The cage 26 can be formed of sheet metal and includes an annular bottom ring or cup portion 32 and a plurality of axially extending fingers 34. In one form of the invention the cage was constructed of a 1050 or 1070 spring steel having a Rockwell hardness of between around Rc 40 to around Rc 45. The cage 26 can be formed by initially blanking from a thin, flat sheet having a thickness of around 0.04".

In the form of the invention shown, six fingers 34 are circumferentially arranged in a hexagonal pattern around the periphery of the ring portion 32 with each engaging a corresponding flat of the hexagonally shaped outer surface of the laminations or disc springs 24a-d. The outer end portions 36 of the fingers 34 are folded radially inwardly to grip the uppermost disc spring 24a. Also the bottom surface of the ring portion 32 can be dished axially inwardly to generally conform to the dished contour of the lowermost disc spring 24d. The ring portion 32 has a central, generally circular opening 38 which when the cage 26 is secured to the laminations or disc springs 24a-d will be generally concentric with the threaded central bore 32. Thus the outer contour of the nut 12 can be hexagonally or otherwise irregularly shaped to facilitate gripping with a wrench the same as the head of a bolt.

The upper end portion 16 has a first or upper thread stop defined by a deformed thread portion or discontinuity 40 in one of its threads. The deformed portion 40 is formed from material of the body of the stud 14 in a shallow root 42 of the thread such that its associated crest 43 does not extend radially outwardly beyond its adjacent crests 44. The nut 12 is adapted to be threaded onto the upper stud portion 16 to define the nut and stud assembly 10. The deformed portion 40 provides a predetermined interference with the threads of nut bore 32 and hence acts as a stop to initially prevent further travel of the nut 12 on the threaded upper portion 16. In the configuration as shown in FIG. 1, the nut and stud assembly 10 can be handled as a threaded bolt with the nut 12 functioning as a bolt head.

Thus the nut and stud assembly 10 can be used to secure a pair of workpieces such as an engine block 42 and a cylinder head 44 separated by a sealing gasket 46. The engine block 42 has a threaded bore 48 adapted to threadably receive the threaded lower portion 18 of the stud 14. In utilizing the nut and stud assembly 10, the nut 12 can be gripped by a suitable wrench (not shown) and the stud 14 of assembly 10 threaded into the workpiece bore 48. The deformed portion 40 is selected to provide sufficient resistance to the threads of nut bore 32 such as to require a torque in excess of the torque required to install the assembly 10 into the workpieces 42 and 44.

Figure 4:
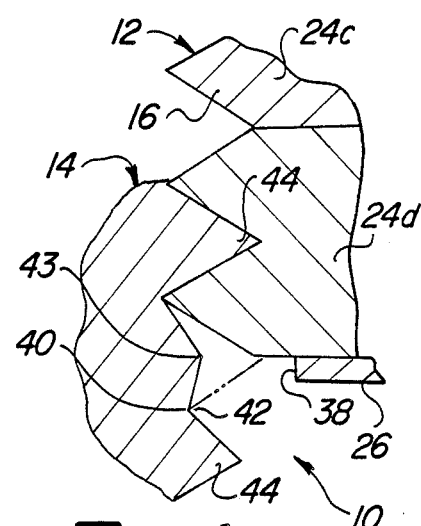
FIG. 4 is a fragmentary sectional view to enlarged scale of the portion of the nut and stud assembly in the circle 4 of FIG. 1.
Figure 3:
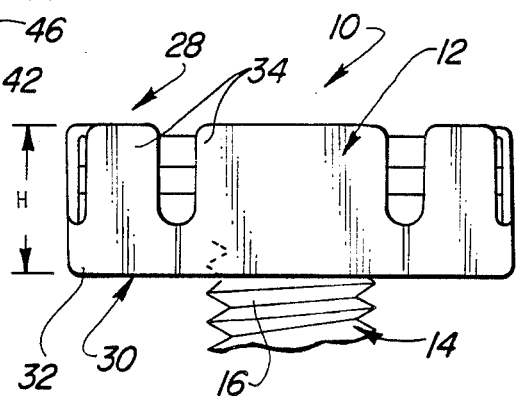
FIG. 3 is a fragmentary side elevational view of a portion of the nut and stud assembly of FIG. 1.
Figure 2:
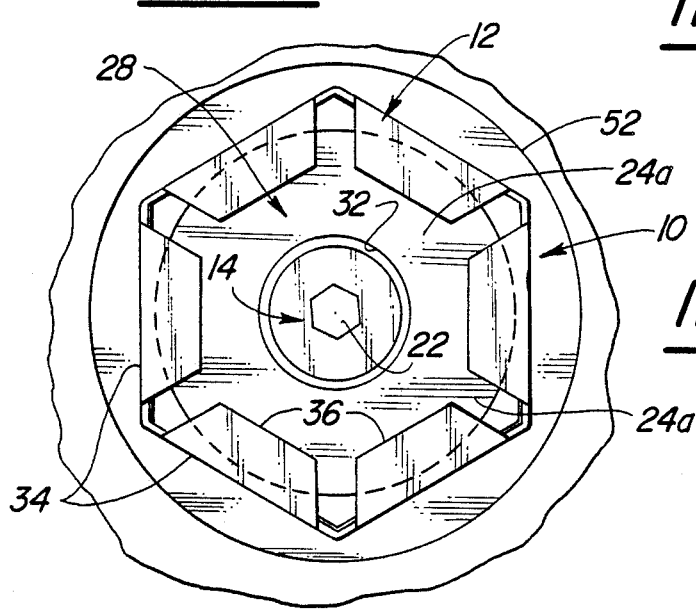
FIG. 2 is a top elevational view of the assembly of FIG. 1.

The nut and stud assembly 10 will be torqued into the threaded workpiece bore 48 until a second or lower stop is engaged by the stud 14. Thus the stud 14 at its lower portion 18 also has a deformed thread portion or discontinuity 50 which will engage the threads of the workpiece bore 48 to resist further movement of the stud 14 of the assembly 10 into the bore 48. The deformed portion 50 is formed similarly to deformed portion 40 (FIG. 4) and hence is also formed from material of the body of the stud 14 to define a shallow root 47 of the thread such that its associated crest 49 does not extend radially beyond its adjacent crests 51. The amount of deformation and hence the torque resistance of the deformed portion 50 to the threads of bore 48 is selected to be greater than the torque resistance of the deformed portion 40 to the threads of nut bore 32 of nut 12 and hence the torque applied to the nut 12 will reach a break away torque of a preselected magnitude at which the nut 12 will overcome the resistance of upper deformed portion 40 and the nut 12 can now be threaded further onto the threaded upper portion 16. The nut 12 will be run down on the stud 14 until it engages a washer 52; thereafter the nut 12 is torqued to a preselected magnitude such that the workpieces 42 and 44 are clamped together with a desired clamp force.

The threads on the upper stud portion 16 and lower thread portion 18 are preferably formed by rolling. In this way the upper stop 40 and the lower stop 50 can be readily formed by modification to the rolling dies for forming the threads.

The upper stop 40 is selected to provide a hold off torque which is at least around 50% greater than the anticipated mean value of torque to run the lower stud portion 18 into the threaded bore 48 down to the lower stop 50. The lower stop 50 is selected to provide a hold off torque which is at least around 50% greater than the hold off torque provided by the upper stop 40.

In securing workpieces such as the engine block 42 and cylinder head 44 it is important that a selected number of threads of the bore 48 be engaged by the stud 14 to assure adequate strength for the anticipated loads. In the embodiment of FIGS. 1-4 the lower stop 50 is located a distance L from the end of lower portion 18 and defines a preselected number of threads to be engaged by the threads of bore 48 to provide the desired strength to the fastened joint. In this way the depth of the bore 48 can be selected to be somewhat greater than the distance L while the location of the stop 50 at distance L on the lower stud portion 18 can be readily controlled to assure uniformity of numbers of threads engaged in a production environment. This will also provide better control to minimize the excess length of stud 14 extending beyond the nut 12 after final installation. In one form of the invention the number of threads and the distance L was selected to provide for an ultimate failure in tension on the stud 14 rather than in shear across either the threads of the lower stud portion 18 or the threads of the bore 48.

It is desirable that the stud 14 be of a minimum overall length and that the amount of excess length of the stud 14 extending above the nut 12 after installation is a minimum. At the same time, it is important that the nut 12 in its final clamp up of the workpieces 42 and 44 be free running on the upper stud portion 16. In other words it is significant that the threads of the nut 12 will all have moved through and past the first or upper stop 40 prior to final clamp up. If the threads of the nut 12 were still engaged with the upper stop 40 at final clamp up the relationship between the torque on the nut 12 and the clamp load on the workpieces 42 and 44 via the tensile load on the stud 14 would be unpredictable resulting in undesirable variations in loading. Thus it is desirable to locate the upper stop 40 at a distance X which is as close to the end of the upper stud portion 16 as possible while leaving a sufficient distance Y above the upper surface 53 of washer 52 or if no washer 52 is used then a distance Y' above the upper surface 55 of upper workpiece 44 to permit free running of the nut 12. The distance Y (Y') is selected to be generally equal to the height H of nut 12 (see FIGS. 1 and 3). Thus the distance X is selected to be sufficient to permit the minimum number of threads in engagement between the nut 12 and upper stud portion 16 to withstand the initial driving torque required on the assembly 10 and to withstand the break away torque required to move the nut 12 through and past the upper stop 40. It has been found that an adequate minimum thread engagement can be provided where the distance X is selected such that between around 1½ to around 2 threads are engaged between the nut 12 and the upper stud portion 16 when the nut 12 has its threads in initial blocking engagement with the upper stop 40. The noted minimum number of threads is generally supported by and in accordance with IFI and SAE standards for minimum thread engagement.

In some instances the upper stop 40 may retain enough interference after the nut 12 has been run through and past it such that the assembly 10 can be removed simply by engagement of the threads of the nut 12 with the upper stop 40 as the nut 12 is backed off from the stud 14. However, to assist removal, a suitable wrench (such as an Allen head) can be applied to the irregularly shaped cavity 22 and removal torque applied to the stud 14.

The action of the threads of nut 12 in moving through the upper stop 40 generally reforms the blocking material into a mating thread form without damage to the threads of nut 12. As noted, in this regard, it is significant that the nut 12 be free running on the thread length Y; if the threads of the nut 12 have been damaged or deformed in moving through upper stop 40 then such free running characteristic will be impaired. Thus it is desirable that the nut 12 be harder than the threaded upper stud portion 16. For components made of a ferrous material, it is desirable that the nut 12 have a Rockwell hardness which is between around 5 Rc to around 15 Rc higher than the Rockwell hardness of the associated stud 14 with the minimum difference being around 5 Rc. In some applications it is desirable that the stud 14 be of a high Rockwell hardness in the range of from around 30 Rc to around 35 Rc. In this case it is desirable that the nut 12 have a Rockwell hardness of from around 40 Rc to around 45 Rc. A conventional one piece nut, however, having a hardness of from around 40 Rc to around 45 Rc can exhibit a brittle characteristic which could result in cracking from the stresses, i.e. hoop stresses, etc., resulting from the magnitudes of torque applied at final clamp up and subsequent loading. To provide a softer, less brittle nut, however, could result in damage to the nut threads as they are moved through the upper stop 40. The laminated nut 12 does not appear to exhibit the same sensitivity to hardness as the conventional solid, one piece nuts and hence can be most advantageously used where a high hardness fastener is required. But the laminated nut 12 has other advantages.

As noted from the early discussions, the laminated nut 12 because of the spring like characteristics of the disc springs 24 a-d will provide a desired load retention and at the same time a prevailing torque feature as a result of the mechanical interference between the threads on disc springs 24 a-d and the threads on the upper stud portion 16. These characteristics are especially advantageous in applications where the workpieces are subject to significant cyclical variations in temperature and load. One such application is the fastening of the engine block 42 and cylinder head 44 separated by the sealing gasket 46 (see FIG. 2). The sealing gasket 46 is of a conventional resilient material which can accommodate variations in clamp load onto the block 42 and head 44 and the nut and stud assembly 10. However, the use of the laminated nut 12 in lieu of a standard nut will result in a more controlled and/or restricted variations in clamp force and an ability to maintain clamp load via the spring action of disc springs 24 a-d. In this regard it should be noted that the use of a bolt in such applications may result in torsional wind up the magnitude of which could be undesirable especially where longer bolts are required. Excessive torsional windup could result in a significant loss of clamp up force between the workpieces on the workpieces cycle and the torsional windup in a sense unwinds. Thus the present invention of a nut and stud assembly is especially useful in many applications where the nut is of a laminated construction as described.

It may be desirable in some applications to simply determine the length L of thread engagement in the threaded workpiece bore by the position at which the lower stud portion bottoms out. A modified structure having that characteristic is shown in FIG. 5 in which components similar to like components in the embodiment of FIGS. 1-4 are given the same numerical designations with the addition of a letter postscript "a". It should be understood that such similarly numbered components, unless described otherwise, function the same and hence a description of each such component shall not be repeated.

Thus in FIG. 5, the nut and stud assembly 10a is used to secure an engine block 42a and a cylinder head 44a separated by a sealing gasket 46a. The lower stud portion 18a of stud 14a is continuously threaded without a distorted portion or stop such as lower stop 40 on lower stud portion 18 of FIG. 1. The number of threads engaged is determined by the depth La of the threaded bore 48a. Thus the assembly 10a will be torqued via the nut 12a until the lower stud portion 18a bottoms out in bore 48a. This will provide a desired number of threads in engagement over the length La.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A nut and stud assembly for securing workpieces together with at least one of the workpieces having a threaded bore comprising:

a stud member having a first threaded portion at one end, a nut adapted to be threaded onto said first threaded portion, said stud member having a second threaded portion at an opposite end from said one end and adapted to be threaded into the threaded workpiece bore, first stop means between said nut and said first threaded portion and permitting initial movement of said nut on said first threaded portion up to a first preselected position and adapted to engage said nut to resist further threaded movement of said nut until a preselected first magnitude of torque between said nut and said stud has been attained, said stud with said nut at said first preselected position functioning similarly as a headed bolt and adapted to have said second threaded portion threaded into said workpiece bore through the application of torque at a second magnitude of torque on said nut, said second magnitude of torque being less than said first magnitude of torque, second stop means being engageable for resisting movement of said second threaded portion in said workpiece bore when said second threaded portion has attained a preselected second position in said workpiece bore with the torque of such resisting movement being at a magnitude of torque greater than said first magnitude, said first stop means responsive to a magnitude of torque on said nut greater than said first magnitude and less than said second magnitude for permitting further movement of said nut onto said first threaded portion beyond said first preselected position after said second stop means has been engaged with said nut being free running on that part of said first threaded portion beyond said first preselected position whereby the workpieces can be clamped together in the manner of a nut and separate stud combination, said nut comprising a plurality of conical spring disc washers and a cage, said cage receiving and holding said disc washers in a stacked, aligned relationship to define a central opening threaded for threaded engagement on said first threaded portion, said cage including a ring portion and a plurality of axially extending fingers cooperating with said ring portion to hold said disc washers in said stacked aligned relationship.

2. The nut and stud assembly of claim 1 with said first stop means comprising first material located in said first threaded portion for interfering with the threads of said nut.

3. The nut and stud assembly of claim 1 with said second stop means comprising second material located in said second threaded portion for interfering with the threads of said workpiece bore.

4. The nut and stud assembly of claim 1 with said first stop means comprising first material located in said first threaded portion for interfering with the threads of said nut, said second stop means comprising second material located in said second threaded portion for interfering with the threads of said workpiece bore.

5. The nut and stud assembly of claim 1 with said first stop means comprising first material located in said first threaded portion for interfering with the threads of said nut, said nut having a preselected hardness greater than the hardness of said material such that said nut can be threaded through said first material in response to the application of torque on said nut substantially greater than said first magnitude and less than said second magnitude without damage to the threads of said nut.

6. The nut and stud assembly of claim 1 with said first stop means comprising first material located in said first threaded portion for interfering with the threads of said nut, said nut having a preselected hardness greater than the hardness of said material such that said nut can be threaded through said first material in response to the application of torque on said nut substantially greater than said first magnitude and less than said second magnitude without damage to the threads of said nut, said first material being formed in said first threaded portion integrally from the material of said stud.

7. The nut and stud assembly of claim 1 with said first stop means comprising first material located in said first threaded portion for interfering with the threads of said nut, said nut having a preselected hardness greater than the hardness of said material such that said nut can be threaded through said first material in response to the application of torque on said nut substantially greater than said first magnitude and less than said second magnitude without damage to the threads of said nut, said first material being formed in said first threaded portion integrally from the material of said stud, said second stop means comprising second material located in said second threaded portion for interfering with the threads of said workpiece bore, said second material being formed in said second threaded portions integrally from the material of said stud.

8. The nut and stud assembly of claim 1 with said first magnitude of torque being at least around 50% greater than said second magnitude of torque.

9. The nut and stud assembly of claim 1 with said first magnitude of torque being at least around 50% greater than said second magnitude of torque, said torque of such resisting movement being at least around 50% greater than said first magnitude of torque.

10. The nut and stud assembly of claim 1 with said first stop means comprising first material located in said first threaded portion for interfering with the threads of said nut, said nut having a preselected hardness greater than the hardness of said material such that said nut can be threaded through said first material in response to the application of torque on said nut substantially greater than said first magnitude and less than said second magnitude without damage to the threads of said nut, said first material being formed in said first threaded portion integrally from the material of said stud, said nut being made of a ferrous material and having a Rockwell hardness which is between around 5 Rc to around 15 Rc higher than that Rockwell hardness of said stud.

11. The nut and stud assembly of claim 1 with the threads of said nut in said initial movement in said first threaded portion to said first preselected position engaging between around 1½ to around 2 threads of said first threaded portion.

12. The nut and stud assembly of claim 1 with the threads of said nut in said initial movement in said first threaded portion to said first preselected position engaging between around 1½ to around 2 threads of said first threaded portion, said second portion of said second stop means locating said stud relative to the workpieces such that the distance of further movement of said nut on said first threaded portion beyond said first position will be generally equal to the height of said nut whereby the workpieces will be finally clamped with a minimum length of said stud extending past said nut.

13. The nut and stud assembly of claim 1 with said first stop means comprising first material located in said first threaded portion for interfering with the threads of said nut, said nut having a preselected hardness greater than the hardness of said first material such that said nut can be threaded through said first material in response to the application of torque on said nut substantially greater than said first magnitude and less than said second magnitude without damage to the threads of said nut, said first material being formed in said first threaded portion integrally from the material of said stud, said nut and stud assembly being of ferrous materials having a high strength with said nut having a Rockwell hardness of from between around 40 Rc to around 45 Rc and said stud having a Rockwell hardness of between around 30 Rc to around 35 Rc.

14. A nut and stud assembly for securing workpieces together with at least one of the workpieces having a threaded bore comprising:
a stud member having a first threaded portion at one end,
a nut adapted to be threaded onto said first threaded portion,
said stud member having a second threaded portion at an opposite end from said one end and adapted to be threaded into the threaded workpiece bore,
first stop means between said nut and said first threaded portion and permitting initial movement of said nut on said first threaded portion up to a first preselected position and adapted to engage said nut to resist further threaded movement of said nut until a preselected first magnitude of torque between said nut and said stud has been attained,
said stud with said nut at said first preselected position functioning similarly as a headed bolt and adapted to have said second threaded portion threaded into said workpiece bore through the application of torque at a second magnitude of torque on said nut,
said second magnitude of torque being less than said first magnitude of torque,
second stop means being engageable for resisting movement of said second threaded portion in said workpiece bore when said second threaded portion has attained a preselected second position in said workpiece bore with the torque of such resisting movement being at a magnitude of torque greater than said first magnitude,
said first stop means responsive to a magnitude of torque on said nut greater than said first magnitude and less than said second magnitude for permitting further movement of said nut onto said first threaded portion beyond said first preselected position after said second stop means has been engaged with said nut being free running on that part of said first threaded portion beyond said first preselected position whereby the workpieces can be clamped together in the manner of a nut and separate stud combination,
said first stop means comprising first material located in said first threaded portion for interfering with the threads of said nut.

15. The nut and stud assembly of claim 14 with said second stop means comprising second material located in said second threaded portion for interfering with the threads of said workpiece bore.

16. The nut and stud assembly of claim 14 with said second stop means comprising second material located in said second threaded portion for interfering with the threads of said workpiece bore.

17. The nut and stud assembly of claim 1 with said first stop means comprising first material located in said first threaded portion for interfering with the threads of said nut, said second means comprising second material located in said second threaded portion for interfering with the threads of said workpiece bore.

18. The nut and stud assembly of claim 14 with said nut having a preselected hardness greater than the hardness of said material such that said nut can be threaded through said first material in response to the application of torque on said nut substantially greater than said first magnitude and less than said second magnitude without damage to the threads of said nut.

19. The nut and stud assembly of claim 14 with said nut having a preselected hardness greater than the hardness of said material such that said nut can be threaded through said first material in response to the application of torque on said nut substantially greater than said first magnitude and less than said second magnitude without damage to the threads of said nut, said first material being formed in said first threaded portion integrally from the material of said stud.

20. The nut and stud assembly of claim 14 with said nut having a preselected hardness greater than the hardness of said material such that said nut can be threaded through said first material in response to the application of torque on said nut substantially greater than said first magnitude and less than said second magnitude without damage to the threads of said nut, said first material being formed in said first threaded portion integrally from the material of said stud, said second stop means comprising second material located in said second threaded portion for interfering with the threads of said workpiece bore, said second material being formed in said second threaded portions integrally from the material of said stud.

21. The nut and stud assembly of claim 14 with said first magnitude of torque being at least around 50% greater than said second magnitude of torque.

22. The nut and stud assembly of claim 14 with said first magnitude of torque being at least around 50% greater than said second magnitude of torque, said torque of such resisting movement being at least around 50% greater than said first magnitude of torque.

23. The nut and stud assembly of claim 14 with said nut having a preselected hardness greater than the hardness of said material such that said nut can be threaded through said first material in response to the application of torque on said nut substantially greater than said first magnitude and less than said second magnitude without damage to the threads of said nut, said first material being formed in said first threaded portion integrally from the material of said stud, said nut being made of a ferrous material and having a Rockwell hardness which is between around 5 Rc to around 15 Rc higher than the Rockwell hardness of said stud.

24. The nut and stud assembly of claim 14 with the threads of said nut in said initial movement in said first threaded portion to said first preselected position engaging between around 1½ to around 2 threads of said first threaded portion.

25. The nut and stud assembly of claim 14 with the threads of said nut in said initial movement in said first threaded portion to said first preselected position engaging between around 1½ to around 2 threads of said first threaded portion, said second portion of said second stop means locating said stud relative to the workpieces such that the distance of further movement of said nut on said first threaded portion beyond said first position will be generally equal to the height of said nut whereby the workpieces will be finally clamped with a minimum length of said stud extending past said nut.

26. The nut and stud assembly of claim 14 with said nut having a preselected hardness greater than the hardness of said first material such that said nut can be threaded through said first material in response to the application of torque on said nut substantially greater than said first magnitude and less than said second magnitude without damage to the threads of said nut, said first material being formed in said first threaded portion integrally from the material of said stud, said nut and stud assembly being of ferrous materials having a high strength with said nut having a Rockwell hardness of from between around 40 Rc to around 45 Rc and said stud having a Rockwell hardness of between around 30 Rc to around 35 Rc.

27. A nut and stud assembly for securing workpieces together with at least one of the workpieces having a threaded bore comprising:

a stud member having a first threaded portion at one end, a nut adapted to be threaded onto said first threaded portion, said stud member having a second threaded portion at an opposite end from said one end and adapted to be threaded into the threaded workpiece bore, first stop means located at a preselected first position in said first threaded portion permitting initial movement of said nut on said first threaded portion up to a first preselected position and adapted to engage the threads of said nut to resist further threaded movement of said nut until a preselected first magnitude of torque between said nut and said stud has been attained, said stud with said nut at said first preselected position functioning similarly as a bolt and adapted to have said second threaded portion threaded into said workpiece bore through the application of torque at a second magnitude of torque on said nut, said second magnitude of torque being less than said first magnitude of torque, second stop means being engageable for resisting movement of said second threaded portion in said workpiece bore when said second threaded portion has attained a preselected second position in said workpiece bore with the torque of such resisting movement being at a magnitude of torque greater than said first magnitude, said first stop means responsive to a magnitude of torque on said nut greater than said first magnitude and less than said second magnitude for permitting further movement of said nut onto said first threaded portion beyond said first preselected position after said second stop means has been engaged with said nut being free running on that part of said first threaded portion beyond said first preselected position whereby the workpieces can be clamped together in the manner of a nut and separate stud combination, said nut comprising a plurality of conical spring disc washers and a cage, said cage receiving and holding said disc washers in a stacked, aligned relationship to define a central opening threaded for threaded engagement on said first threaded portion, said cage including a ring portion and a plurality of axially extending fingers cooperating with said ring portion to hold said disc washers in said stacked, aligned relationship, said first stop means comprising first material located in said first threaded portion for interfering with the threads of said central opening, said disc washers having a preselected hardness greater than the hardness of said first material such that said nut can be threaded through said material in response to the application of torque on said nut substantially greater than said first magnitude and less than said second magnitude without damage to the threads of said central opening.

28. The nut and stud assembly of claim 27 with said second stop means comprising second material located in said second threaded portion for interfering with the threads of said workpiece bore.

29. The nut and stud assembly of claim 27 with said second stop means comprising second material located in said second threaded portion for interfering with the threads of said workpiece bore.

30. The nut and stud assembly of claim 27 with said nut having a preselected hardness greater than the hardness of said first material such that said nut can be threaded through said first material in response to the application of torque on said nut substantially greater than said first magnitude and less than said second magnitude without damage to the threads of said nut.

31. The nut and stud assembly of claim 27 with said nut having a preselected hardness greater than the hardness of said first material such that said nut can be threaded through said first material in response to the application of torque on said nut substantially greater than said first magnitude and less than said second magnitude without damage to the threads of said nut, said first material being formed in said first threaded portion integrally from the material of said stud.

32. The nut and stud assembly of claim 27 with said nut having a preselected hardness greater than the hardness of said first material such that said nut can be threaded through said first material in response to the application of torque on said nut substantially greater than said first magnitude and less than said second magnitude without damage to the threads of said nut, said first material being formed in said first threaded portion integrally from the material of said stud, said second stop means comprising second material located in said second threaded portion for interfering with the threads of said workpiece bore, said second material being formed in said second threaded portions integrally from the material of said stud.

33. The nut and stud assembly of claim 27 with said first magnitude of torque being at least around 50% greater than said second magnitude of torque.

34. The nut and stud assembly of claim 27 with said first magnitude of torque being at least around 50% greater than said second magnitude of torque, said torque of such resisting movement being at least around 50% greater than said first magnitude of torque.

35. The nut and stud assembly of claim 27 with said nut having a preselected hardness greater than the hardness of said first material such that said nut can be threaded through said first material in response to the application of torque on said nut substantially greater than said first magnitude and less than said second magnitude without damage to the threads of said nut, said first material being formed in said first threaded portion integrally from the material of said stud, said nut being made of a ferrous material and having a Rockwell hardness which is between around 5 Rc to around 15 Rc higher than that Rockwell hardness of said stud.

36. The nut and stud assembly of claim 27 with the threads of said nut in said initial movement in said first threaded portion to said first preselected position engaging between around 1½ to around 2 threads of said first threaded portion.

37. The nut and stud assembly of claim 27 with the threads of said nut in said initial movement in said first threaded portion to said first preselected position engaging between around 1½ to around 2 threads of said first threaded portion, said second portion of said second stop means locating said stud relative to the workpieces such that the distance of further movement of said nut on said first threaded portion beyond said first position will be generally equal to the height of said nut whereby the workpieces will be finally clamped with a minimum length of said stud extending past said nut.

38. The nut and stud assembly of claim 27 with said nut having a preselected hardness greater than the hardness of said first material such that said nut can be threaded through said first material in response to the application of torque on said nut substantially greater than said first magnitude and less than said second magnitude without damage to the threads of said nut, said first material being formed in said first threaded portion integrally from said stud, said nut and stud assembly being of ferrous materials having a high strength with said nut having a Rockwell hardness of from between around 40 Rc to around 45 Rc and said stud having a Rockwell hardness of between around 30 Rc to around 35 Rc.

* * * * *